United States Patent
Lee et al.

(10) Patent No.: US 7,707,337 B2
(45) Date of Patent: Apr. 27, 2010

(54) OBJECT-BASED STORAGE DEVICE WITH LOW PROCESS LOAD AND CONTROL METHOD THEREOF

(75) Inventors: Sang-Min Lee, Daejeon (KR); Seong-Woon Kim, Daejeon (KR); Myung-Joon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 564 days.

(21) Appl. No.: 11/193,285

(22) Filed: Jul. 28, 2005

(65) Prior Publication Data

US 2006/0136779 A1 Jun. 22, 2006

(30) Foreign Application Priority Data

Dec. 20, 2004 (KR) .................. 10-2004-0108967

(51) Int. Cl.
*G06F 13/00* (2006.01)
*G06F 13/12* (2006.01)
*G06F 13/38* (2006.01)

(52) U.S. Cl. ......................... 710/74; 710/100
(58) Field of Classification Search .............. 710/74
See application file for complete search history.

(56) References Cited

U.S. PATENT DOCUMENTS

| | | | | |
|---|---|---|---|---|
| 5,768,618 A | * | 6/1998 | Erickson et al. | 710/9 |
| 5,974,496 A | * | 10/1999 | Miller | 710/315 |
| 6,038,641 A | * | 3/2000 | Zangenehpour | 711/119 |
| 7,206,915 B2 | * | 4/2007 | DeSouter et al. | 711/203 |
| 2002/0059540 A1 | | 5/2002 | Mann et al. | |
| 2003/0200232 A1 | * | 10/2003 | Matsuoka et al. | 707/200 |
| 2006/0045090 A1 | * | 3/2006 | Ronciak et al. | 370/392 |

FOREIGN PATENT DOCUMENTS

| | | |
|---|---|---|
| JP | 05-265925 | 10/1993 |
| JP | 2000-040057 | 2/2000 |
| KR | 1999-0065664 | 8/1999 |
| KR | 102002005154 | 6/2002 |
| KR | 10-2002-0059139 | 7/2002 |
| KR | 10-2004-0056309 A | 6/2004 |
| KR | 1020040068338 | 7/2004 |

OTHER PUBLICATIONS

Xubin He, et al., *STICS: SCSI-to-IP cache for storage area networks*, Journal of Parallel and Distributed Computing, vol. 64, pp. 1069-1085, Sep. 2004.

Feng Zhou, et al., *TODS: Cluster Object Storage Platform Designed for Scalable Services*, Proceedings of the Fifth International Conference on Algorithms and Architectures of Parallel Processing, pp. 36-43, Oct. 2002.

* cited by examiner

*Primary Examiner*—Alford W Kindred
*Assistant Examiner*—Zachary K Huson
(74) *Attorney, Agent, or Firm*—Blakely, Sokoloff, Taylor & Zafman (57) ABSTRACT

An object-based storage device with a low process load and a control method thereof are provided. The object-based storage device includes: a storage unit; a temporary storage unit; a transmission unit; a first control unit; and a second control unit. Particularly, the temporary storage unit and the transmission unit are provided separate from the main storage unit and the system bus, and these separately provided temporary storage unit and transmission unit allow a direct data transmission, which attributes to a reduction in a process load and a burden on the system bus.

10 Claims, 11 Drawing Sheets

OBJECT-BASED STORAGE DEVICE WITH LOW PROCESS LOAD AND CONTROL METHOD THEREOF

FIELD OF THE INVENTION

The present invention relates to an object-based storage device with a low process load and a control method thereof; and, more particularly, to an object-based storage device with a low process load and a control method thereof to decrease a CPU load and a heavy burden on a system bus through eliminating an operation of data copy between a user address space and an operating system address space by allowing a direct data transmission from a block storage device to a network device via additional PMEM, which is a peripheral component interconnect memory, and exclusive bus both separately provided from a main memory and a system bus.

DESCRIPTION OF THE RELATED ART

An object-based storage device (OSD) is one substitutional technology for a commonly used block-based storage device. In contrast to the block-based storage device that generates meta data essentially required to retrieve files at servers, the OSD is an intelligence storage device that initiates the creation of meta data by itself. That is, although the meta data representing a physical location of a current data is generated at a file system operated at a server and an application program such as a database, the OSD is provided with basic functions necessary for a storage operation including file systems, meta data management or the like. Thus, this specifically provided capability of the OSD contributes to a decrease in a load to the server and to increase a data access speed. Also, the OSD has flexibility supporting heterogeneous platforms.

Typically, OSD architecture is achieved on the basis of a system including a storage area network (SAN) storage device and several tens of high performance central processing units (CPUs) through the use of a cluster type middleware software. At this time, it is mandated to copy data between a user address space and an operating system address space in order for the OSD to receive and transmit data from a network. However, there may be a problem of a high process load during the data copy operation.

There has been an attempt to provide a specific object service, for instance, a high capacity multimedia object service, using OSD architecture with optimal configuration and layout. However, since the OSD is specified to a certain transmission service, it may be difficult to support various types of objects.

SUMMARY OF THE INVENTION

It is, therefore, an object of the present invention to provide an object-based storage device with a low process load and a control method thereof to decrease a CPU load and a heavy burden on a system bus through an elimination of data copy between a user address space and an operating system address space by allowing a direct data transmission from a block storage device to a network device via additional PMEM, which is a peripheral component interconnect memory, and exclusive bus both separately provided from a main memory and a system bus.

In accordance with an aspect of the present invention, there is provided an object-based storage device with a low process load, including: a storage unit for storing data based on an object; a temporary storage unit enabled with a high-speed access and provided separate from the storage unit; a transmission unit enabled with a data transmission and provided separated from a system bus; a first control unit for reading a corresponding object data stored into the storage unit in response to an object read request signal, transmitting the read object data to a second control unit via direct transmission method with use of the transmission unit and storing the object data transmitted from the second control unit via direct transmission method in response to an object write request signal inputted from outside; and the second control unit for temporarily storing the object data transmitted from the first control unit through the transmission unit into the temporary storage unit and then transmitting the object data to a network device via direct transmission method with use of the transmission unit and for temporarily storing the object data received from the network device via direct transmission method in response to the object write request signal inputted from outside and then transmitting the object data to the first control unit via direct transmission method with use of the transmission unit.

In accordance with another aspect of the present invention, there is provided a method for controlling an object-based storage device with a low process load, including the steps of: managing an availability list to which available memory block information of an additional memory provided separate from a main memory is connected; transferring certain memory block information selected from the availability list to an allocation list in response to an object read request signal; reading a corresponding object data from the additional memory block via direct transmission method with use of a memory block corresponding to the transferred memory block information and then transmitting the read object data via direct transmission method to a request side; transferring the corresponding memory block information of the allocation list to the availability list after the read operation is finished; transferring certain memory block information selected from the availability list to the allocation list in response to an object write request signal; transmitting an object data inputted from outside to the additional memory via direct transmission method with use of a memory block corresponding to the selected memory block information, so that the object data are written; and transferring the corresponding memory block information of the allocation list to the availability list after the write operation is finished.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 1:
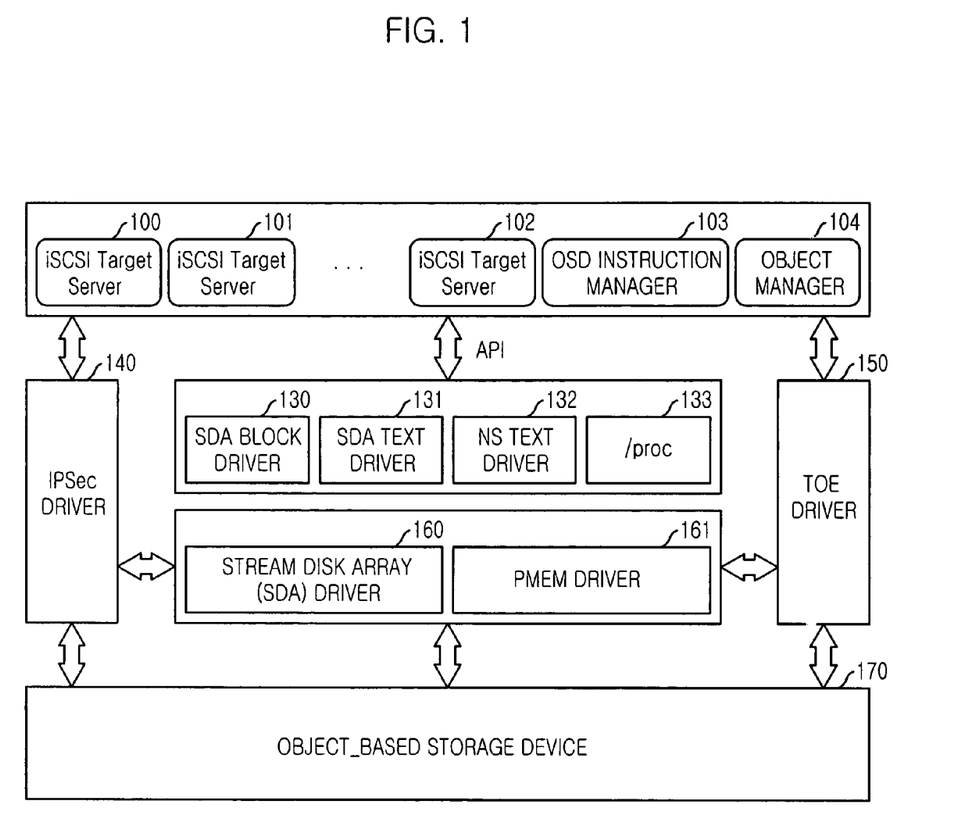
FIG. 1 is a configuration diagram showing an embodied object-based storage device (OSD) with a low process load in accordance with an embodiment of the present invention.

FIG. 1 is a configuration diagram showing one embodied object-based storage device (OSD) with a low process load in accordance with the present invention.

As shown, the OSD includes a software and a hardware. The software of the OSD includes: a plurality of OSD user processes 100 to 104; a PMEM driver 161; a stream disk array (SDA) block driver 130; a SDA text driver 131; a transmission control protocol (TCP)/internet protocol (IP) offload engine (TOE) driver 150; an Internet protocol (IP) security driver 140; an NS text driver 132; and a /proc 133.

The OSD user processes 100 to 104 provide an object related service by accessing to a PMEM, which is a peripheral component interconnect (PCI) memory. The PMEM driver 161 manages the PMEM, and the SDA block driver 130 guaranteeing a high performance disk via disk striping over a plurality of identical disks. The SDA text driver 131 is not capable of executing a buffering function. The TOE driver 150 directly transmits PMEM data via zero-copy mode according to a direct memory access (DMA) method along with the use of PMEM blocks. The IP security driver 140 supports IP security, and the NS text driver 132 transmits a PMEM driver service request of an operating system address space to the plurality of OSD user processes 100 to 104. The /proc 133 provides information on PMEM to the plurality of OSD user processes 100 to 104.

Figure 2:
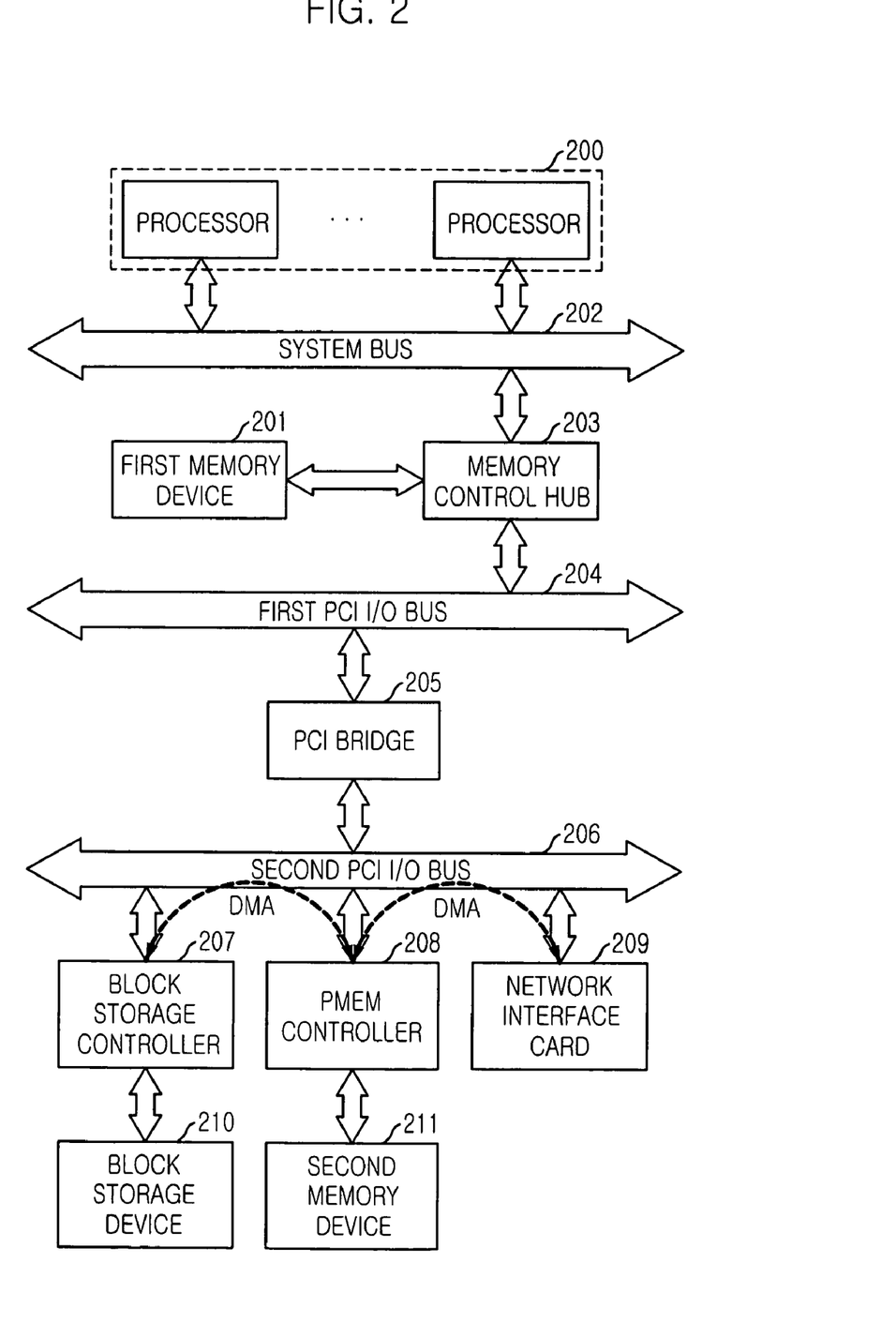
FIG. 2 is a configuration diagram showing an embodied hardware platform of an OSD with a low process load in accordance with the present invention.

As shown in FIG. 2, the hardware of the OSD includes: a central processing unit (CPU) 200; a system bus 202; a first memory device 201 which is a main memory; a memory control hum 203; a first PCI input/output (I/O) bus 204; a PCI bridge 205; a second PCI I/O bus 206; a block storage controller 207; a PMEM controller 208; a network interface card (NIC) 209; a block storage device 210; and a second memory device 211 which is a PCI memory, i.e., PMEM.

The block storage device 207 and the network interface card 209 transmit data at high speed via DMA method without being interfered with the system bus 202 used by the CPU 200 and the first PCI I/O bus 204. Especially, for the high speed data transmission, the block storage device utilizes the PMEM controller 208 and an exclusive bus, more specifically, the second PCI I/O bus 206 independent of the CPU 200.

Figure 3:
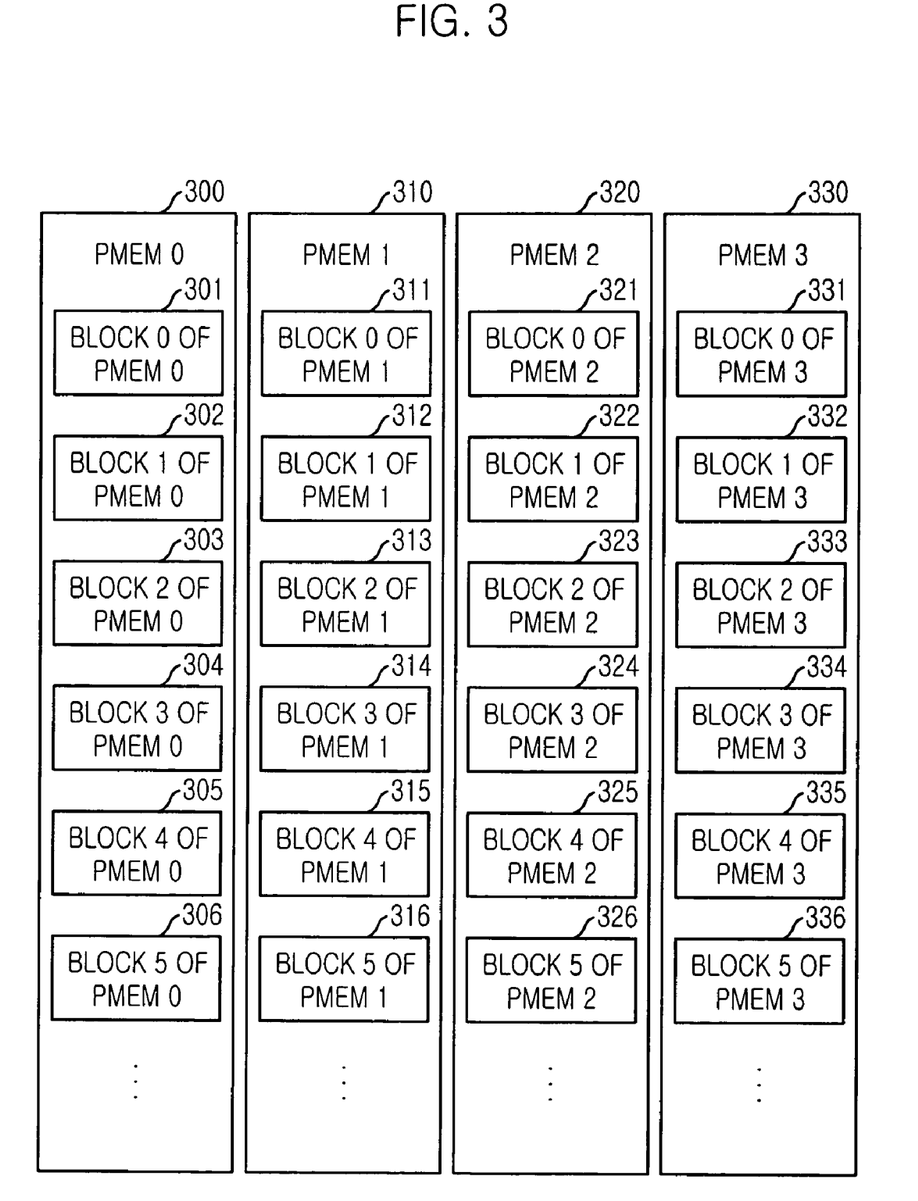
FIG. 3 is a diagram showing one exemplary layout of PMEM blocks in an OSD with a low process load in accordance with the present invention.

Referring to FIG. 3, the PMEM controller 208 manages the second memory device 211 by dividing the second memory device 211 into 4 blocks with different sizes of approximately 2 megabytes, 1 megabytes, 512 kilobytes, and 256 kilobytes according to an object characteristic. At this time, the size of the PMEM block is a scale of the data transmission via DMA method executed by the block storage device 210 or the network interface card 209 at the second memory device 211.

Meanwhile, the plurality of OSD user processes 100 to 104 should be capable of accessing to the PMEM memory, i.e., the second memory device 211, simultaneously to provide an object related service of the OSD. However, if the plurality of OSD user processes 100 to 104 execute read/write operation simultaneously on one PMEM block, the PMEM block, which is a commonly shared resource, cannot store accurate information.

Figure 4:
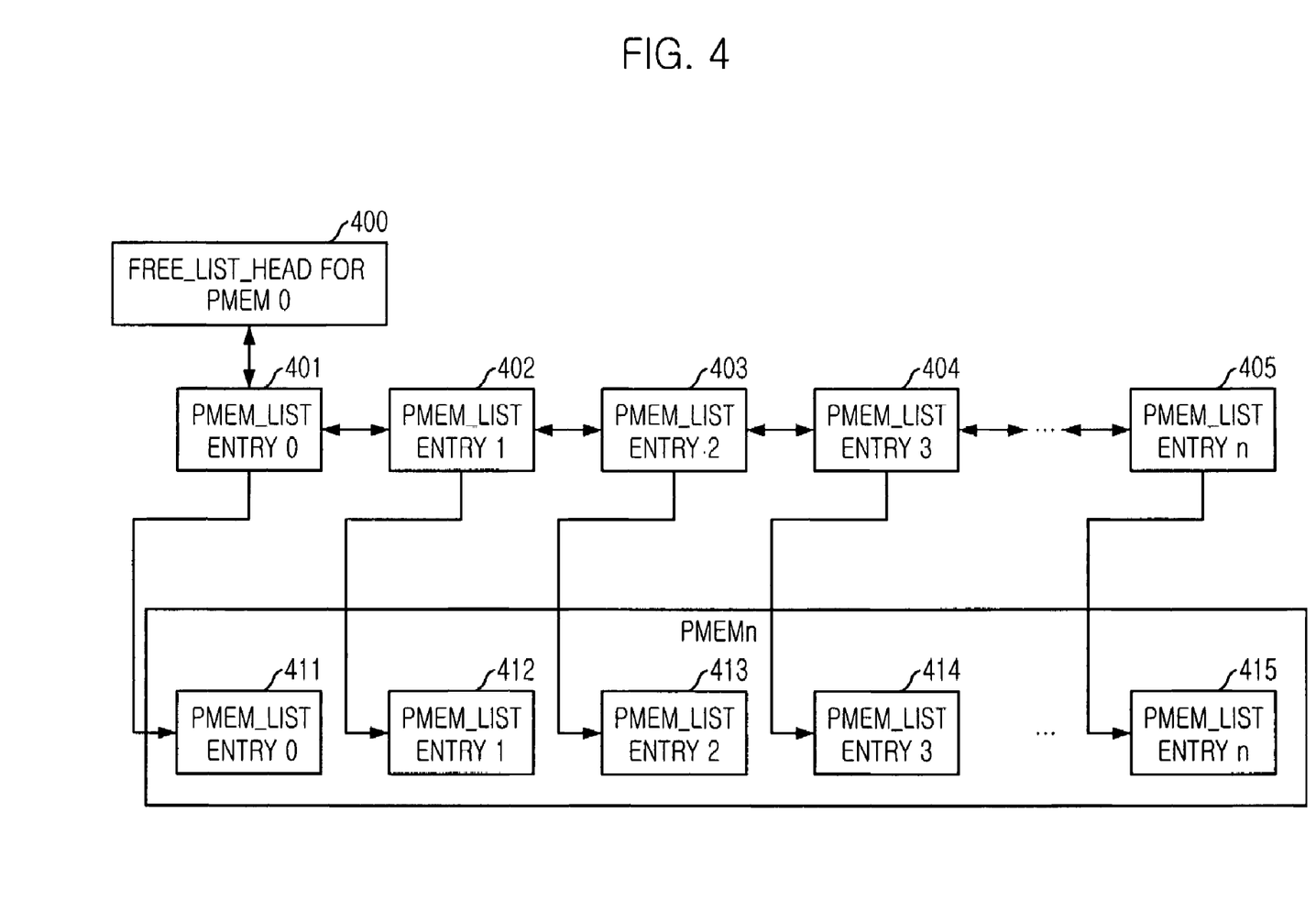
FIG. 4 is a diagram showing an embodied availability list for managing PMEM blocks in an OSD with a low process in accordance with the present invention.

To solve this problem, pieces of information on the PMEM blocks including user identifiers, physical starting addresses and so forth are expressed through n number of "pmem_list_entry" 401 to 405. Herein, n is an integer. FIG. 4 shows these n number of "pmem_list_entry" 401 to 405. At this time, those unused pieces of PMEM block information are connected to an availability list "free_list_head" 400. On the basis of the above configuration, the OSD user processes 100 to 104 can figure out at which PMEM device the available PMEM block is placed. Also, the availability list "free_list_head" 400 is prepared for each PMEM.

Figure 5:
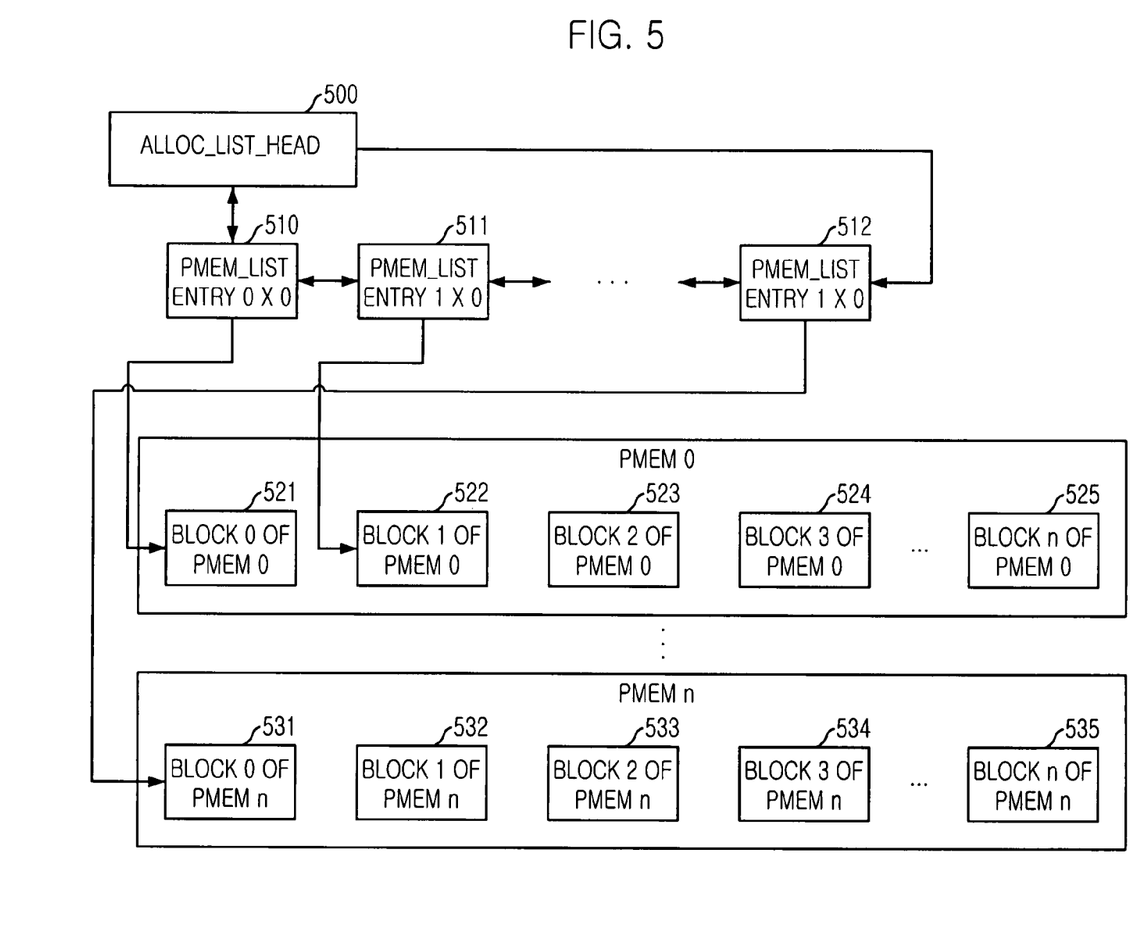
FIG. 5 is a diagram showing an embodied allocation list for managing PMEM blocks in an OSD with a low process in accordance with the present invention.

As illustrated in FIG. 5, pieces of information on allocated PMEM blocks are connected to an allocation list "alloc_list_head" 500. That is, after the PMEM block allocation, the PMEM block information "pmem_list_entry" is taken from the availability list "free_list_head" 400 and included into the allocation list "alloc_list_head" 500. Unlike the availability list "free_list_head" 400, there is one allocation list "alloc_list_head" 500.

In general, it is necessary to copy an operating system address space over a user address space to allow the OSD user processes 100 to 104 to access to the allocated PMEM block through the PMEM driver 161. That is, a direct access to the allocated PMEM block is not possible unless the operating system address space is not copied over the user address space.

Figure 6:
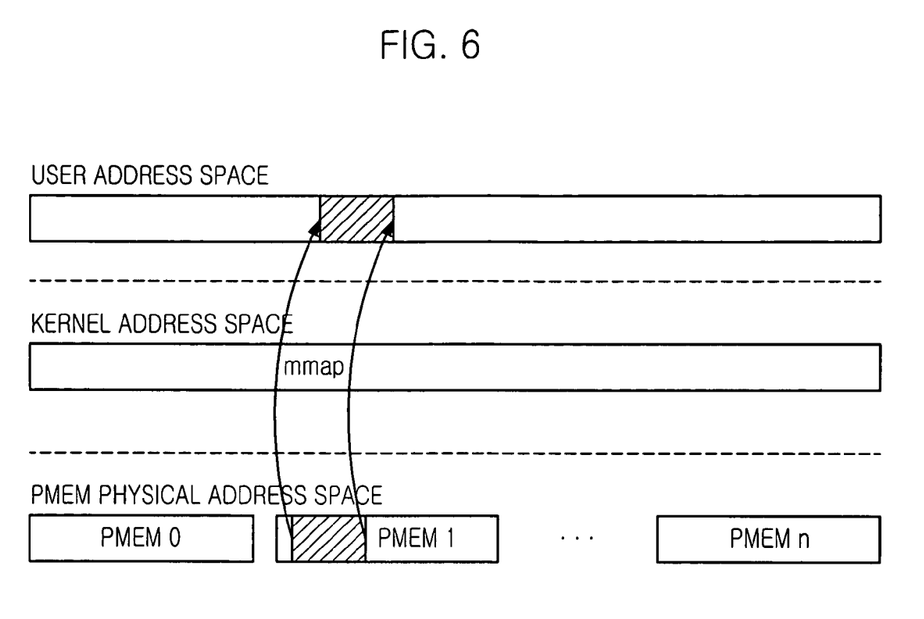
FIG. 6 is a diagram illustrating an OSD user process that performs an object read/write operation through zero-copy among control methods of an OSD with a low process load in accordance with one embodiment of the present invention.

To solve this problem, as shown in FIG. 6, the OSD user processes 100 to 104 are set to have a direct access to the OSD, more specifically, the PMEM block, by employing a system call called "mmap." The use of system call "mmap" makes it possible to eliminate the copy operation between the operating system address space and the user address space.

Figure 7:
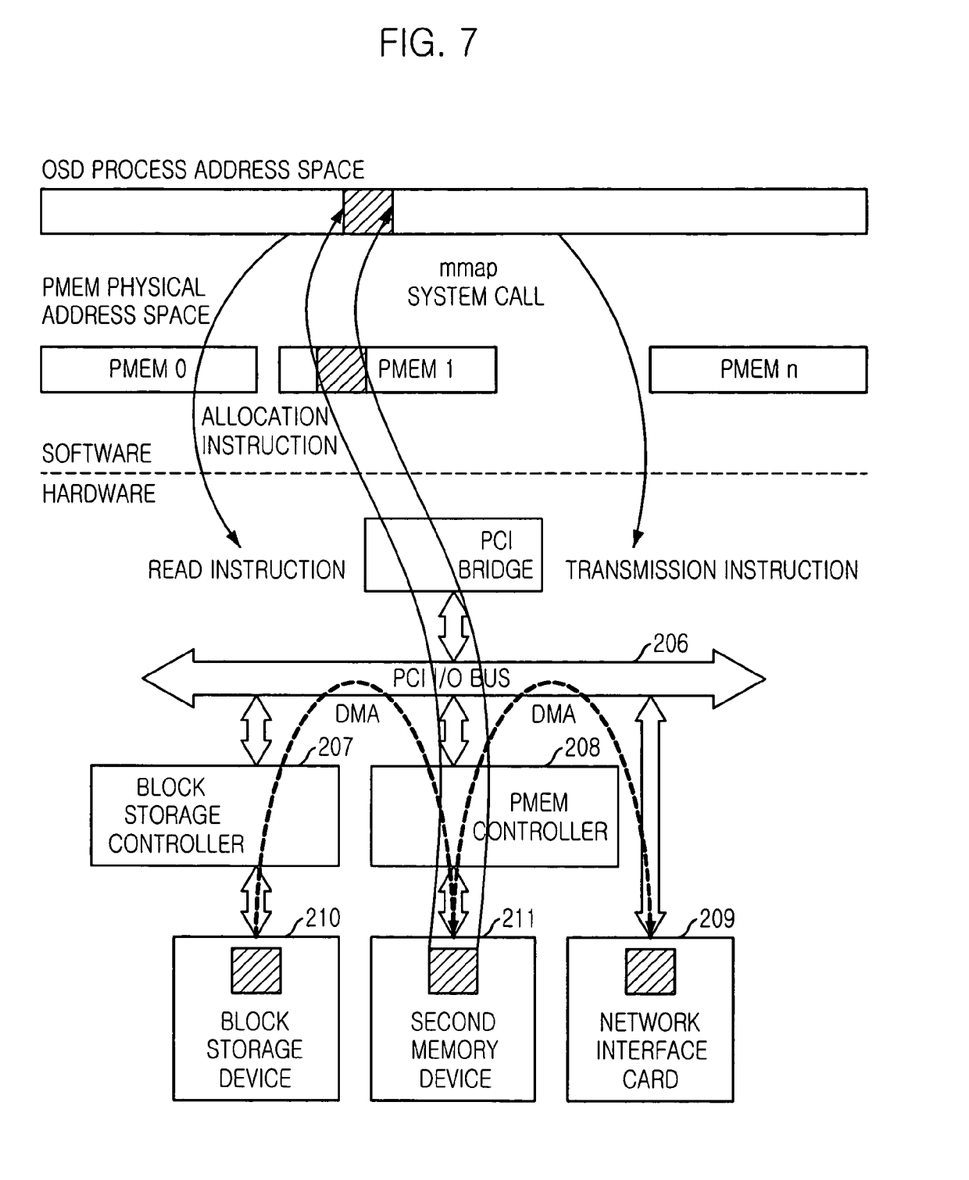
FIG. 7 is a diagram illustrating an OSD user process that performs object data transmission through PMEM blocks among control methods of an OSD with a low process load in accordance with said one embodiment of the present invention.

FIG. 7 is a diagram illustrating that the OSD user processes 100 to 104 transmit object-based data through using a PMEM block among control methods of an OSD with a low process load in accordance with one embodiment of the present invention.

AS for the OSD architecture, by allocating second memory device 211, i.e., the PMEM, between the block storage device 210 and the network interface card 209 and using the DMA method, a direct access to the OSD and as a result, interference of the CPU 200 and the system bus 202 can be minimized as well as read/write operation of data is allowed with use of the network interface card 209 at the block storage device 207.

Hereinafter, detailed description of the read/write operation procedure with respect to the OSD object will be provided with reference to FIGS. 8A to 9B.

Figure 8A:
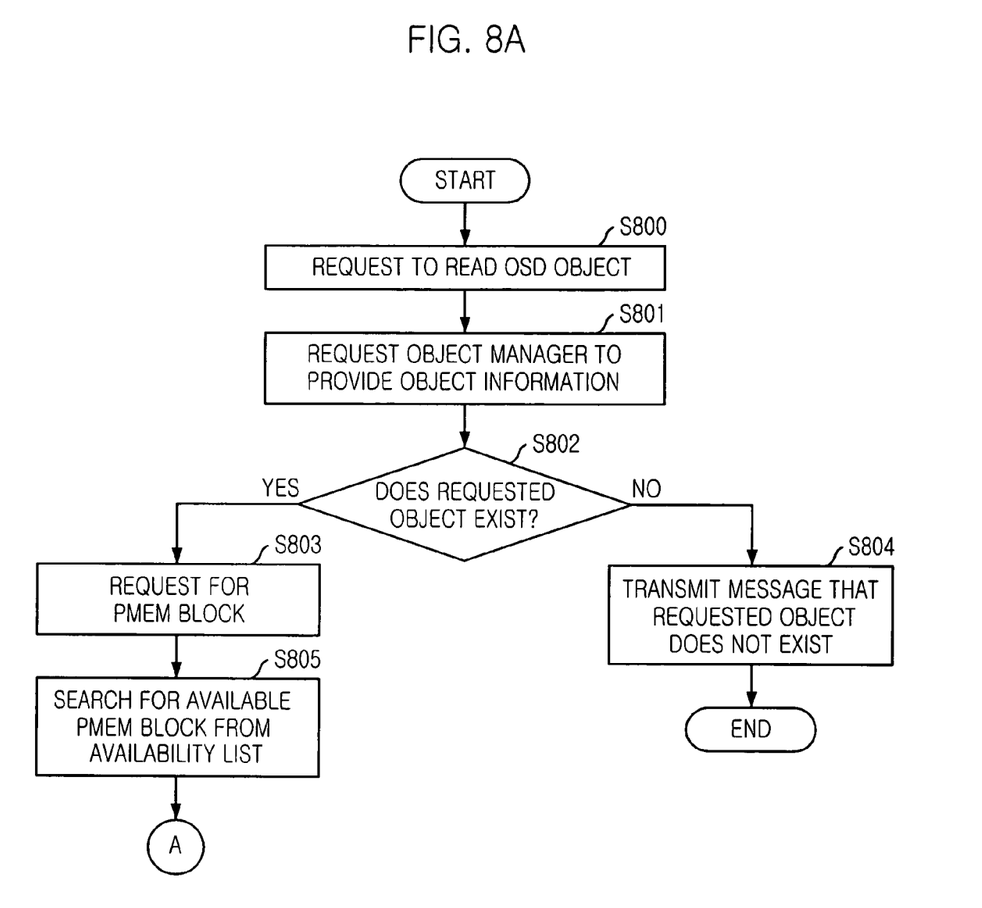
FIGS. 8A and 8B are flowcharts describing a read operation on an OSD object among control methods of an object-based storage device with a low process load in accordance with said one embodiment of the present invention.
Figure 8B:
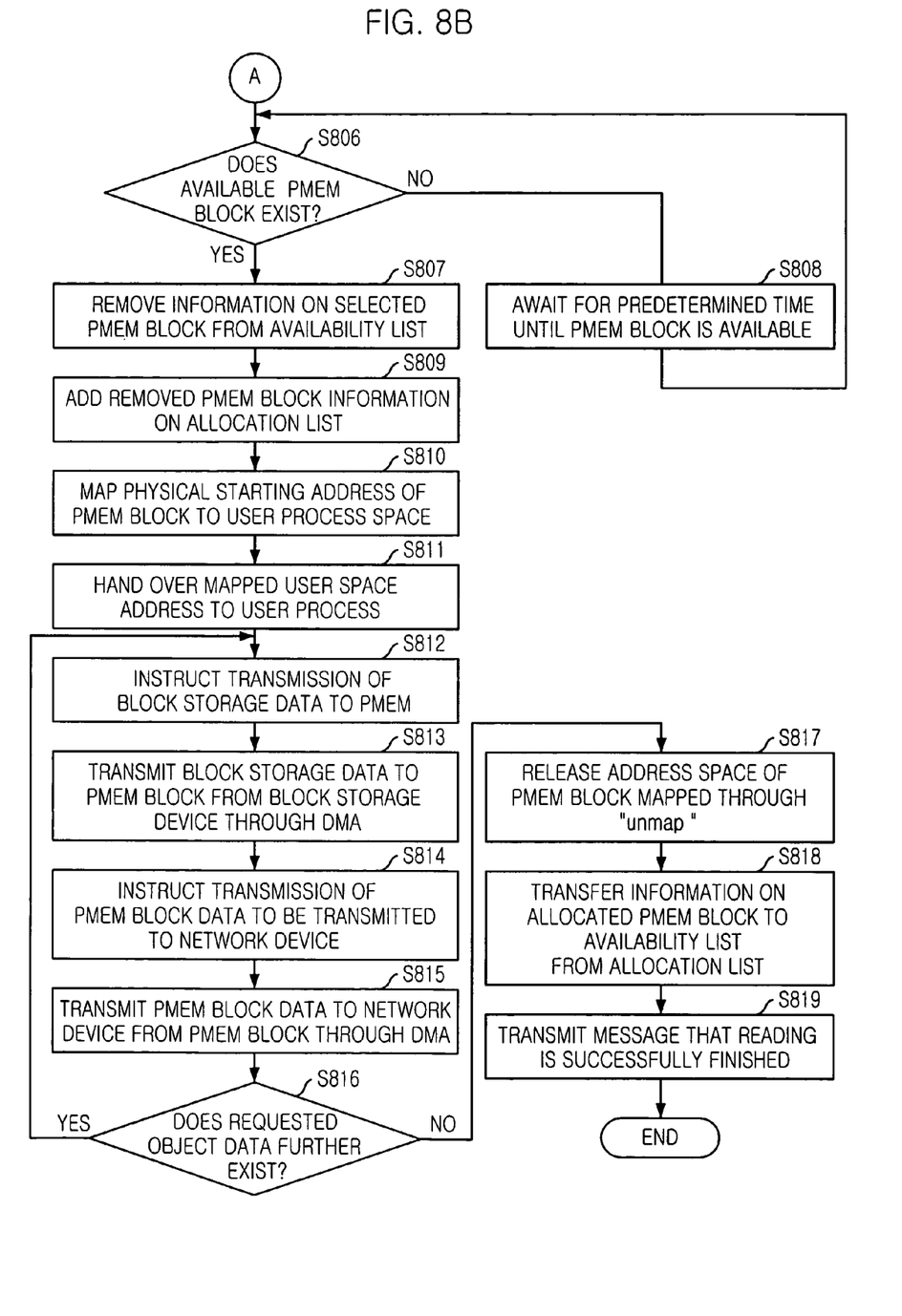

FIGS. 8A and 8B are flowcharts describing a read operation procedure over the OSD object among control methods of the OSD with the low process load in accordance with said one embodiment of the present invention.

At step 800, if the OSD user processes 100 to 104 receive a read request signal for a specific object, the OSD user processes 100 to 104 request object information to an object manager 104 at step 801. Particularly, the object information includes location information indicating at which part of the block storage device 207 the object is stored, authentication information, size, generation time, final modification time and so on.

At step 802, the object manager 104 checks whether the object requested by the OSD user processes 100 to 104 exists. If the requested object does not exist, at step 804, a message containing the information on the absence of the requested object is generated and transmitted to a user and, the read operation procedure is terminated.

If the requested object and the read authentication exist, a starting address of the block storage device 210 of the requested object is acquired. Afterwards, at step 803, a PMEM block allocation request is transmitted to the PMEM driver 161 through the NS text driver 132.

At step 805, the PMEM driver 161 searches for a first useable PMEM block from the availability list "free_lsit_head" 400. After the search, at step 806, it is checked whether the available PMEM block exists. If the available PMEM block does not exist, that is, the PMEM blocks, which are limited resources, are all used, at step 808, a standby state is instigated. At this time, the standby state continues for a predetermined time until the PMEM block can be used. After the predetermined time, the operation returns to the step 806 of checking whether the available PMEM blocks exist, and this step is repeated fro a predetermined period.

Meanwhile, if the available PMEM block exists, information on the selected PMEM "free_pmem_entry" is removed from the availability list "free_list_head" 400 at step 807. Then, at step 809, the removed information on the selected PMEM "free_pmem_entry" is added to the allocation list "alloc_list_head" 500. Also, at step 810, a physical starting address of the PMEM block is mapped to the user address space. Then, the NS text driver 132 transmits a starting address of the mapped user address space to the OSD user processes 100 to 104 via system call "mmap." As mentioned above, the "mmap" instruction is a system call used to map contents of a memory to a file or device.

At step 812, the OSD user processes 100 to 104 receiving the starting address of the user address space from the NS text driver 132 request a PMEM block read operation to a block storage device driver including the SDA text driver 131 and the SDA block driver 130. Then, at step 813, the SDA text driver 131 and the SDA block driver 130 controls the block storage controller 207 so that the corresponding object data is transmitted to the second memory device 211, i.e., the PMEM, which is a PCI memory, by using the DMA method.

The PMEM controller 208 receives the object data from the block storage device 210 through the block storage controller 207 and stores the object data into the second memory device 211. Also, at step 814, the PMEM controller 208 transmits an instruction to send the received object data to the network interface card 209 by using the DMA method to the TOE driver 150.

Because of the transmission of the instruction, at step 815, the corresponding block data stored into the block storage device 210 is transmitted to the network interface card 209 according to the DMA method. Meanwhile, it is checked whether read requested objects are all read at 816. In the case of incomplete reading, the steps 812 to 815 are repeatedly carried out to read all of the object data.

If all of the object data are read, an address space of the PMEM block mapped to the user address space via system call called "unmap" is released at step 817. Then, at step 818, information on the release PMEM block is deleted from the allocation list "alloc_list_head" 500 and added to the availability list "free_list_head" 400. Afterwards, at step 819, a message that the read request is successfully completed is generated and transmitted to the OSD user processes 100 to 104 requested the object read operation.

In addition to the read operation procedure, a write operation procedure will be described in detail with reference to FIGS. 9A and 9B.

Figure 9A:
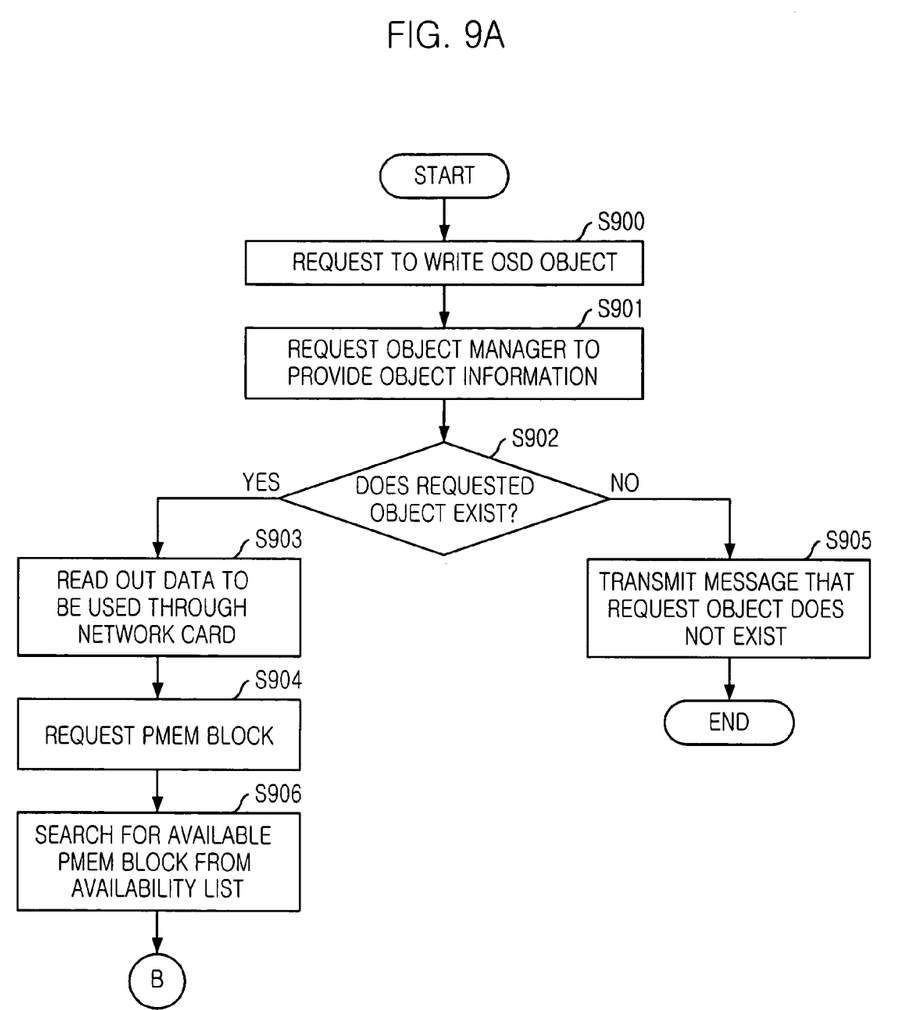
FIGS. 9A and 9B are flowcharts describing a write operation on an OSD object among control methods of an OSD with a low process load in accordance with said one embodiment of the present invention.
Figure 9B:
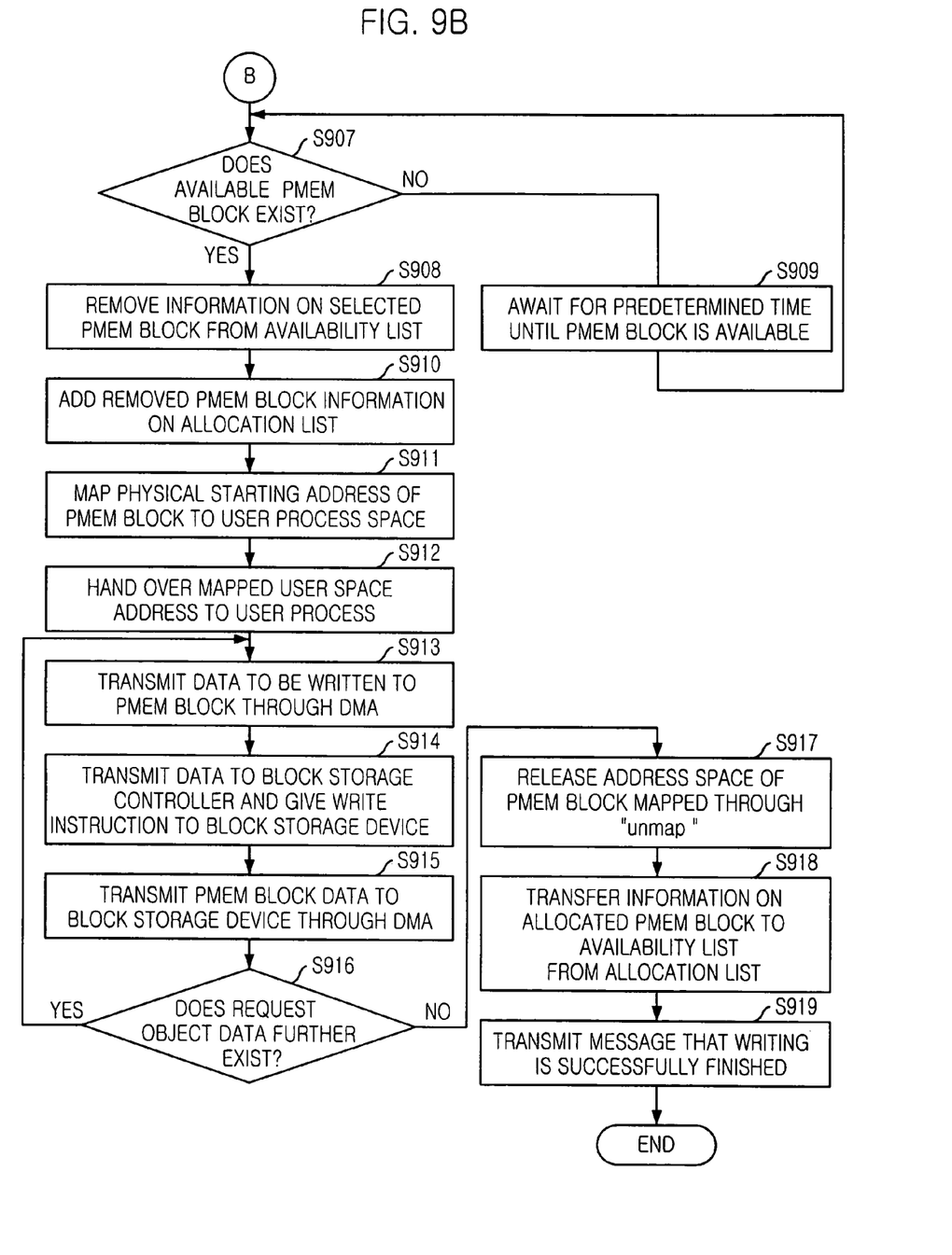

FIGS. 9A and 9B are flowcharts describing a write operation procedure over the OSD object among control methods of the OSD with the low process load in accordance with said one embodiment of the present invention.

At step 900, if the OSD user processes 100 to 104 receive a write request signal for a specific object, the OSD user processes 100 to 104 request object information to an object manager 104 at step 901. Particularly, the object information includes location information indicating where the object is stored, authentication information, size, generation time, final modification time and so on.

At step 902, the object manager 104 checks whether the object requested by the OSD user processes 100 to 104 exists. If the requested object does not exist, at step 905, a message containing the information on the absence of the requested object is generated and transmitted to a user and, the write operation procedure is terminated.

If the requested object and the write authentication exist, a starting address of the block storage device 210 of the requested object is acquired. Afterwards, at step 903, a data to be written is read out through the network interface card 209 and then, stored into the fist memory device 201, which is a main memory.

At step 904, a PMEM block request is inputted to the PMEM driver 161, and at step 906, the PMEM driver 161 searches for a useable PMEM block from the availability list "free_lsit_head" 400. After the search, at step 907, it is checked whether the available PMEM block exists. If the available PMEM block does not exist, that is, the PMEM blocks, which are limited resources, are all used, at step 909, a standby state is instigated. At this time, the standby state continues for a predetermined time until the PMEM block can be used. After the predetermined time, the operation returns to the step 907 of checking whether the available PMEM blocks exist, and this step is repeated fro a predetermined period.

Meanwhile, if the available PMEM block exists, information on the selected PMEM "free_pmem_entry" is removed from the availability list "free_list_head" 400 at step 908. Then, at step 910, the removed information on the selected PMEM "free_pmem_entry" is added to the allocation list "alloc_list_head" 500. Also, at step 911, a physical starting address of the PMEM block is mapped to the user address space. Then, the NS text driver 132 transmits a starting address of the mapped user address space to the OSD user processes 100 to 104 via system call "mmap." As mentioned above, the "mmap" instruction is a system call used to map contents of a memory to a file or device.

Afterwards, at step 913, the object data read out using the network interface card 209 is transferred from the first memory device 201 to the second memory device 211. Also, at step 914, data of the PMEM block is transported to the block storage controller 207 according to the DMA method and, the block storage device 210 is instructed to execute the write operation.

Then, at step 915, data of the corresponding PMEM block stored into the second memory device 211 is transported to the block storage device 210 via DAM method.

Meanwhile, it is checked whether read requested objects are all read at 916. In the case of incomplete writing, the steps 913 to 815 are repeatedly carried out to write all of the object data.

If all of the object data are written, an address space of the PMEM block mapped to the user address space via system call called "unmap" is released at step 917. Then, at step 918, information on the release PMEM block is deleted from the allocation list "alloc_list_head" 500 and added to the availability list "free_list_head" 400. Afterwards, at step 919, a message that the write request is successfully completed is generated and transmitted to the OSD user processes 100 to 104.

The above described method, which is implemented in the form of a program, can be recorded into a computer readable recording medium such as a read-only memory (ROM), a random access memory (RAM), a compact disc (CD)-ROM, a floppy disk, a hard disk, a magnetic disk and so forth. Since the recordation procedure can be easily derivable by those ordinary people skilled in the art, detailed description of such recordation procedure will be omitted.

On the basis of the preferred embodiment of the present invention, the OSD allows a direct data transmission from the block storage device to the network device by using the additional PMEM, i.e., the PCI memory and exclusive bus separate from the main memory and the system bus. Because of this direct data transmission, a process of data copy between the user address space and the operating system address space takes over the CPU with a reduced degree. Also, it is possible to decrease a burden on the system bus.

The present application contains subject matter related to Korean patent application No. 2004-0108967, filed in the Korean Intellectual Property Office on Dec. 20, 2004, the entire contents of which is incorporated herein by reference.

While the present invention has been described with respect to the particular embodiments, it will be apparent to those skilled in the art that various changes and modifications may be made without departing from the scope of the invention as defined in the following claims.

What is claimed is:

1. An object-based storage device with a low process load, comprising:

a storage means for storing data based on an object;

a temporary storage means enabled with a high-speed access and provided separate from the storage means;

a transmission means enabled with a data transmission and provided separated from a system bus;

a first control means for reading a corresponding object data stored into the storage means in response to an object read request signal, transmitting the read object data to a second control means via direct transmission method with use of the transmission means and storing the object data transmitted from the second control means via direct transmission method in response to an object write request signal inputted from outside, wherein the direct transmission method is a direct transfer of the corresponding object data to and from the transmission means without a data copy operation between a user address space and an operating system address space; and the second control means for temporarily storing the object data transmitted from the first control means through the transmission means into the temporary storage means and then transmitting the object data to a network device via direct transmission method with use of the transmission means and for temporarily storing the object data received from the network device via direct transmission method in response to the object write request signal inputted from outside and then transmitting the object data to the first control means via direct transmission method with use of the transmission means, wherein the transmission means includes a peripheral component interconnect (PCI) memory block, the PCI memory block is mapped to the user address space and transmits a mapped user address to a user processor.

2. The object-based device with the low process load as recited in claim 1, wherein the temporary storage means is a random access memory provided separate from the storage means.

3. The object-based device with the low process load as recited in claim 1, wherein the transmission means includes:

a PCI input/output (I/O) bus provided separate from the system bus; and a PCI bridge for connecting a processor with the PCI I/O bus.

4. The object-based device with the low process load as recited in claim 3, wherein the second control means divides the temporary storage means into a number of blocks according to an object characteristic and manages available blocks with use of an availability list and allocated blocks, used for read/write operation selected among the availability lists, with use of an allocation list.

5. A method for controlling an object-based storage device with a low process load, comprising the steps of:

managing an availability list to which available memory block information of an additional memory provided separate from a main memory is connected;

transferring certain memory block information selected from the availability list to an allocation list in response to an object read request signal;

reading a corresponding object data from the additional memory block via direct transmission method with use of a memory block corresponding to the transferred memory block information and then transmitting the read object data via direct transmission method to a request side wherein the direct transmission method is a direct transfer of the corresponding object data and the read object data to and from a direct memory access bus independent of a system bus interfacing with a central processing unit, wherein the direct transfer to eliminate a data copy operation between a user address space and an operating system address space;

transferring the corresponding memory block information of the allocation list to the availability list after the read operation is finished;

transferring certain memory block information selected from the availability list to the allocation list in response to an object write request signal;

transmitting an object data inputted from outside to the additional memory via direct transmission method with use of a memory block corresponding to the selected memory block information, so that the object data are written; and transferring the corresponding memory block information of the allocation list to the availability list after the write operation is finished, wherein the step of reading the object data includes the steps of:

mapping the memory block corresponding to added memory block information to a user address space and transmitting the mapped user address to a user processor;

reading the corresponding object data stored into the additional memory via direct transmission method with use of the mapped memory block according to an instruction from the user processor; and transferring the read object data to a network device via direct transmission method;

wherein the step of writing the object data includes the steps of:

mapping a physical address space of the memory block corresponding to the added memory block information to the user address space and transmitting the mapped user address to the user processor;

reading the object data transferred from a network device via direct transmission method with use of the mapped memory block according to an instruction from the user processor; and transferring and storing the read object data to the additional memory via direct transmission method.

6. The method as recited in claim 5, wherein the memory block is divided into various units according to an object characteristic.

7. The method as recited in claim 5, wherein the step of reading the object data further comprises the steps of:

selecting an available block from the availability list in response to an object data read request signal inputted from a user processor;

removing memory block information corresponding to the selected memory block from the availability list and adding the memory block information to the allocation list;

releasing the mapped user address as the read operation for the object data is finished; and removing the corresponding memory block information from the allocation list and transferring the corresponding memory block information to the availability list.

8. The method as recited in claim 7, wherein the step of mapping the memory block to the user address space and the step of releasing the mapped user address utilize instructions of "mmap" and "unmap."

9. The method as recited in claim 5, wherein the step of writing the object data further comprises the steps of:

selecting an available block from the availability list in response to an object data write request signal inputted from a user processor;

removing memory block information corresponding to the selected memory block from the availability list and adding the memory block information to the allocation list;

releasing the mapped user address space as the write operation for the object data is finished; and removing the corresponding memory block information from the allocation list and transferring the corresponding memory block information to the availability list.

10. The method as recited in claim 9, wherein the step of mapping the memory block to the user address space and the step of releasing the mapped user address utilize instructions "mmap" and "unmap."

* * * * *